United States Patent [19]
Abu-Shumays et al.

[11] 3,741,660
[45] June 26, 1973

[54] CONVERSION OF CIRCULAR DICHROISM SPECTROPOLARIMETER TO LINEAR DICHROISM MEASUREMENT MODE

[75] Inventors: Ahmad Abu-Shumays, Pasadena; Jack J. Duffield, Monrovia, both of Calif.

[73] Assignee: Cary Instruments, a wholly owned subsidiary of Varian Associates, Monrovia, Calif.

[22] Filed: Oct. 27, 1971

[21] Appl. No.: 192,815

[52] U.S. Cl.............. 356/114, 250/225, 350/147, 356/116
[51] Int. Cl. ........................................... G01n 21/40
[58] Field of Search.................... 356/114, 116, 117, 356/97; 250/225; 350/147, 154

[56] References Cited
UNITED STATES PATENTS

| | | | |
|---|---|---|---|
| 3,602,597 | 8/1971 | Sproul................................ | 356/114 |
| 3,540,827 | 11/1970 | Badoz et al.......................... | 356/114 |
| 2,999,418 | 9/1961 | Keston................................ | 356/117 |
| 3,345,907 | 10/1967 | Wada................................... | 356/116 |

Primary Examiner—Ronald L. Wibert
Assistant Examiner—Paul K. Godwin
Attorney—H. Calvin White et al.

[57] ABSTRACT

For use in a spectropolarimeter having an electromagnetic radiation beam source, a detector, a linear polarizer in the path of the beam between said source and detector, and first converter means in said path and characterized as operable to convert linearly polarized radiation to elliptically polarized radiation, the combination comprising:

a. second converter means in said path and characterized as operable to convert elliptically polarized radiation to linearly polarized radiation, and
b. a sample space in the path of the beam passing from said second converter means.

13 Claims, 5 Drawing Figures

3,741,660

CONVERSION OF CIRCULAR DICHROISM SPECTROPOLARIMETER TO LINEAR DICHROISM MEASUREMENT MODE

BACKGROUND OF THE INVENTION

This invention relates generally to linear dichroism measurement apparatus, and more particularly concerns the relatively simple conversion of a circular dichroism spectropolarimeter to a linear dichroism measuring instrument. The invention also concerns the application of such a converted spectro-polarimeter to fluorescence polarization measurements.

A circular dichroism spectro-polarimeter may measure the difference in absorbance of a sample for left and right circularly polarized light. In this type of instrument the sample is illuminated with a monochromatic beam whose state of polarization alternates between left circular and right circular at the carrier frequency of the system. The photometric system then measures the light transmitted by the sample for the two states of polarization, and the instrument electronics system derives from this the difference in absorbance for the two states of polarization.

It is often desired to measure linear dichroism properties exhibited by samples having oriented molecules. Typical of such samples are crystals, thin films, and samples with electrically or mechanically induced orientation. Linear dichroism is defined as the difference of sample absorbance for linearly polarized light with azimuth parallel and perpendicular to the molecular orientation direction. To measure this parameter, one needs to illuminate the sample with a beam of linearly polarized light whose direction of polarization alternates between two orthogonal axes. While the same basic photometric and measurement system of a circular dichroism spectropolarimeter can be used to determine linear dichroism, no way has been known to convert a circular dichroism spectropolarimeter to production of a light beam whose polarization state alternates between left and right linear along mutually orthogonal axes, and in the simple manner as afforded by the invention. Also, no way was known to apply such a converted spectropolarimeter to fluorescence polarization measurements. The system disclosed in the present invention employs simple devices to convert the state of polarization of the light beam in a circular dichroism instrument alternately between two mutually orthogonal linear states. The application of such a modified instrument to fluorescence polarization measurements is also disclosed.

SUMMARY OF THE INVENTION

It is a major object of the invention to overcome the problems referred to above, and specifically to readily convert a circular dichroism spectropolarimeter to linear dichroism measurement, in an unusually advantageous manner. The principle of the apparatus of the invention is based on the fact that a quarter-wave optical retarder converts incident circularly polarized light to linearly polarized light, the direction of linear polarization being ±45° relative to the retardation axes of the quarter wave device, the sign of the direction depending upon the sense of the incident circularly polarized light. That is, if the incident beam alternates between left and right circular, the beam emerging from the quarter-wave retarder will alternate between two linear states of polarization, one at +45° and the other −45° relative to one of the retarder axes. A Fresnel rhomb is a nearly achromatic quarter wave retarder over a wide spectral range, and may be used for the above purpose.

The invention is usable in a spectropolarimeter having an electromagnetic radiation beam source, a detector, a linear polarizer in the path of the beam between the source and detector, and first converter means in the beam path and characterized as operable to convert linearly polarized radiation to elliptically polarized radiation. In this environment, the invention basically comprises a sample space in the beam path between the source and detector, and second converter means in the beam path and characterized as operable to convert circularly polarized radiation to linearly polarized radiation, the linear states having mutually orthogonal axes corresponding respectively to the left and right circular states. As will be seen, the second converter means may comprise a quarter wave retarder such as a Fresnel rhomb. In the latter event, since such a rhomb displaces the light beam, mirrors may be used to restore the beam path to focus on the standard detector of the instrument.

Further, to overcome baseline dispersion problems as will he explained more fully, a third converter means, such as another quarter wave retarder, may be used to convert the beam polarization state to right and left circular, prior to incidence on the detector.

Additional objects include selective location of the sample space in relation to the various converters to enlarge dichroic measurement capability. Thus, if the sample is placed between the second and third converters, measurement of linear dichroism can be achieved; if the sample is placed in the beam path between the first and second converters, a standard circular dichroism measurement can be obtained; and if the sample is located in the path of the beam following the third converter, a circular dichroism measurement of opposite sign is obtained, thus permitting measurement of the difference of circular dichroism between a sample located between the first and second converters and a sample following the third converter.

As will be seen, means may be provided to collect fluorescence radiation from a sample space following the second converter, for directing such radiation to the detector. As will appear, an analyzer is utilized in the path of fluorescence radiation from the sample space.

Finally, in other embodiments of the invention, reversed arrangements of optical elements are provided, as will appear.

These and other objects and advantages of the invention, as well as the details of illustrative embodiments, will be more fully understood from the following description and drawings, in which:

DRAWING DESCRIPTION

DESCRIPTION OF PREFERRED EMBODIMENTS

Figure 1:
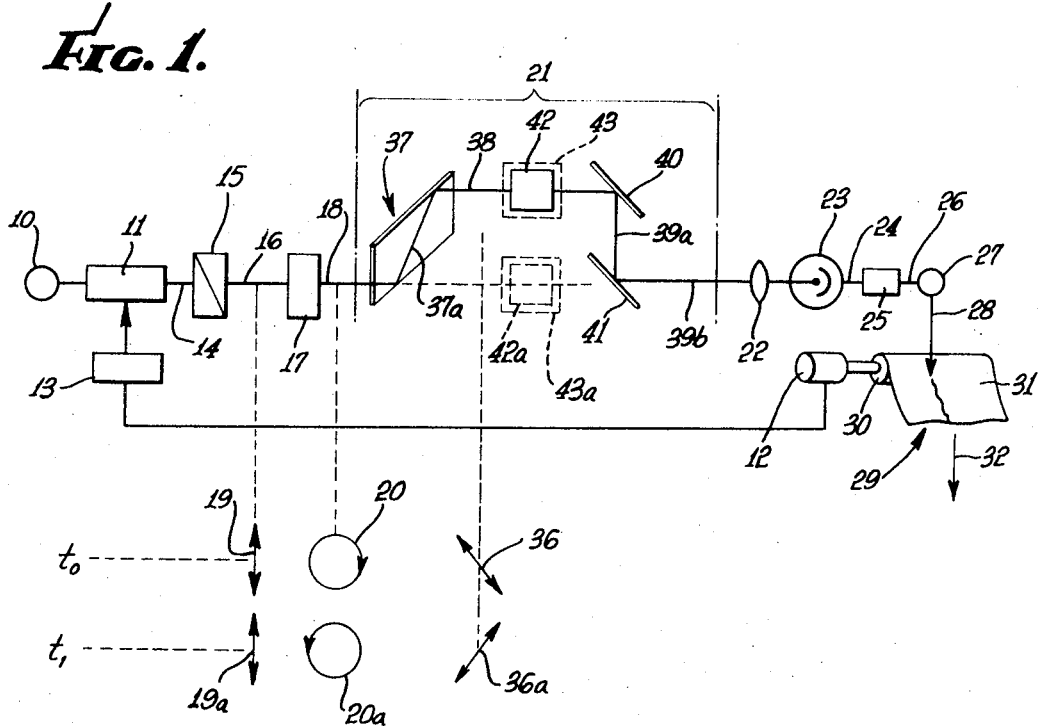
FIG. 1 is a schematic diagram of one system incorporating the invention.

In the system of FIG. 1, the source element 10 emits electromagnetic radiation as a continuum over a relatively broad range of wavelengths, which may be in the visible, infrared and/or ultraviolet portions of the electromagnetic spectrum. The term "light" will be used to designate any of such radiation. The monochromator 11 has the function of selecting from this continuum a relatively narrow band of wavelengths for use in measuring the dichroism of the sample. Depending upon the application, the monochromator may be a relatively coarse apparatus, or a fine high-resolution device such as that employed in the Model 15 Automatic Recording Spectrophotometer produced by Cary Instruments, Monrovia, California. A drive 12 may be coupled via scan control 13 to the monochromator to cause it sequentially to select different narrow wavelength bands of radiation for transmission at 14, the arrangement being such that the nominal or central wavelengths of the selected bands form the locus of a smoothly varying function of time — a monotonic function — of approximately constant slope.

From the beam 14 leaving the monochromator, a substantially linearly polarized component is selected by the polarizer element 15 and transmitted at 16, as, for example, the ordinary beam, the extraordinary beam being suitably eliminated. (Of course the extraordinary beam may be used and the ordinary beam eliminated; while in the case of a dichroic polarizer, which may alternatively be employed, there is only one output beam. Other forms of linear polarizer may also be employed.) See in this regard the Model 60 Spectropolarimeter, an apparatus manufactured by Cary Instruments, as well as the article "Circular Dichroism Theory and Instrumentation," by Abu-Shumays and Duffield, Analytical Chemistry, Vol. 38, June 1966. Such plane polarization is also indicated by the linear vectors 19 and 19a.

Linearly polarized light at 16 is incident upon the converter or modulator 17, or known construction (see for example, the above-referenced Abu-Shumays and Duffield article) so that light leaving the modulator at 18 is in general elliptically polarized, i.e. having electric and magnetic vectors each of whose tips describes an ellipse, in time, when projected onto a plane perpendicular to the direction of light propagation. Such light may be considered equivalent to two counter-rotating circularly polarized components vectorially added, the relative magnitudes of the two components determining the magnitude of the ellipticity. The algebraic sign of the ellipticity is determined by the direction of rotation of the resultant vector, i.e. by the "sense" of the larger circularly polarized component.

The modulator 17 is operable to vary cyclically the ellipticity of elliptically polarized light 18, between left and right circularly polarized states in alternation. In one preferred embodiment this cyclical variation of the ellipticity is continuous and smooth — and in fact nearly sinusoidal— but "step-function" modulation (i.e. stepwise alternation between essentially all left- and essentially all right-circularly polarized light) is also acceptable, and in many cases preferable. The right and left circular polarization extremes at times $t_0$ and $t_1$ corresponding to the times of minus and of plus quarter-wave retardation states in the converter are indicated at 20 and 20a.

Light leaving the modulator at 18 enters the sample space 21, which may be that employed in a circular dichroism measurement system. In a conventional instrument light is incident upon the sample, which absorbs unequally the circularly polarized components of opposite "sense," so that, as the ellipticity periodically changes sign, the total amount of light incident on a phototube 23 undergoes a corresponding periodic variation, i. e. larger when the light passing through the sample possesses a net circularly polarized component of the sense absorbed to lesser degree by the sample, and smaller when the net circularly polarized component is of the sense absorbed to greater degree by the sample.

Assuming circular dichroism measurement mode, phototube 23 receives, via lens 22, both fluctuating and steady (or constant) components of light flux transmitted from the sample so that the current output of the tube contains both fluctuating and DC components. The fluctuating components can be represented by sinusoidal AC, one component of frequency equal to the fundamental frequency of the modulator plate, and other components having frequencies which are odd multiples of the fundamental, and corresponding in magnitude to the difference between the transmission levels for the circularly polarized components of the opposite sense. The DC component corresponds in magnitude to the average or mean transmission of the sample for light in general.

The phototube output at 24 is fed to readout electronic circuitry 25 which may be comparable to that described in U.S. Pat. No. 3,257,894 to Grosjean, with the exception that the carrier frequency may be the fundamental vibratory frequency of the modulator. A phase-sensitive detector may be embodied in block 25 to derive a detected version $I_1$ of the AC output component from tube 23. The readout circuitry derives the ratio of $I_1$ to $I_2$, the latter being a version of the DC output component from tube 23. The value of the ratio is very nearly proportional to the actual value of circular dichroism of the sample.

An output signal at 26 from the readout 25 and proportional to $I_1/I_2$, is fed to the actuator 27 controlling the position of an ink pen 28 of a strip chart recorder 29, thereby to record a value which corresponds to the circular dichroism of the sample. The scan drive motor 12 referred to above also drives a platen 30 translating the chart paper 31 in a direction 32 normal to the motion of the recording pen, so that the position of the pen longitudinally along the chart paper is a continuous known function of wavelength. Thus an ink tracing of circular dichroism versus wavelength is produced. As will appear, in linear dichroism measurement mode, a tracing of linear dichroism versus wavelength is produced.

In accordance with the invention, and considering modulator 17 to be one form of first converter means, a second converter is provided to be responsive to the beam at 18 to alternate its polarization state from left and right circular to two linear states polarized parallel to two mutually orthogonal axes. The latter are indicated at 36 and 36a, at times $t_0$ and $t_1$. The second converter means may, for example, comprise a quarter wave retarder such as a Fresnel rhomb 37. The direction of beam polarization is ±45° relative to the retardation axes of the device 37, i.e. the beam emerging from the latter alternating between two states of polarization, one at ±45° and the other at −45° relative to one of the retarder's axes. A Fresnel rhomb is a nearly achromatic quarter wave retarder over a wide spectral range, and is therefore of unusual advantage. See in this regard, "Analytical Chemistry," Vol. 38, Page 36A and 37A, June 1966. Note the deviated path 37a of the beam within the rhomb.

It will also be observed that the optical axis of the beam emergent from the rhomb is offset from the beam 18 incident on the rhomb. To restore the beam path to its original direction for focusing the beam on the detector 23, mirror means may be provided. The latter may include the two plane parallel mirrors 40 and 41 offset as shown. Accordingly, beam 39 emergent from the sample 42 in holder 43 is deviated at 39a for restoration at 39b indicated as coaxial with beam 18, and focused on the detector 23. Therefore, it is seen that the same photometric system of a circular dichroism polarimeter can be used to determine the linear dichroism of the sample 42, elements 37, 40 and 41 being inserted in sample space 21 to achieve this additional result. With these elements removed, the sample 42 and holder 43 may be restored to positions 42a and 43a respectively in the path of beam 18 for circular dichroism measurements.

Figure 2:
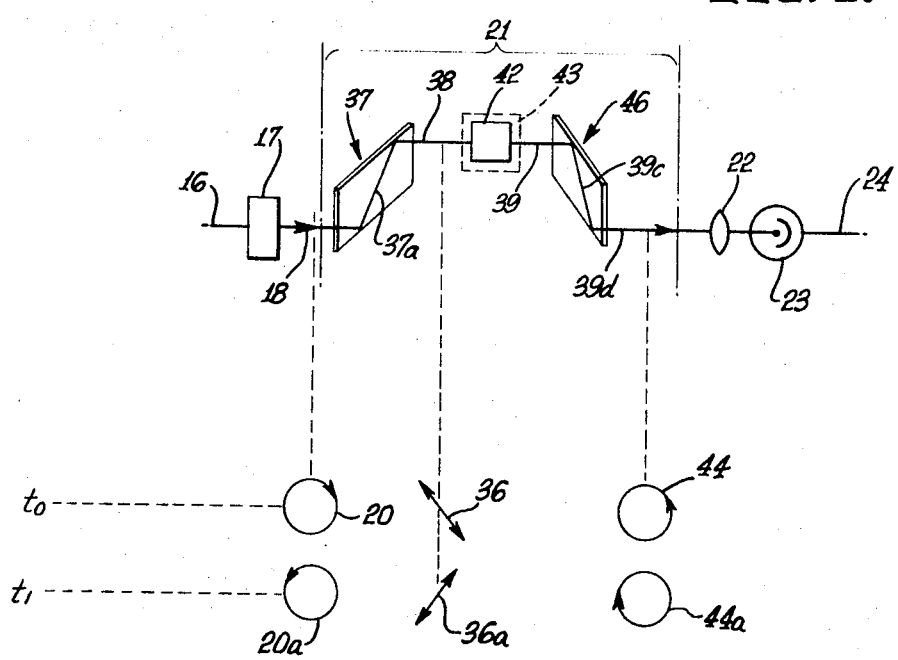
FIG. 2 is a diagram of a modified portion of the FIG. 1 system.

Certain detectors exhibit changes in response when the direction of linearly polarized light incident upon them alternates between two orthogonal axes at the carrier frequency. As a result large offset signals are produced, and furthermore the levels of these signals will be highly wavelength dependant, leading to what may be referred to as poor baseline dispersion. To avoid or minimize this problem, additional or third converter means may be employed to be responsive to the beam emanating from the second converter means to convert its polarization state to alternation between right and left circular, indicated at 44 and 44a at times $t_0$ and $t_1$ respectively. In the example seen in FIG. 2, the third converter means comprises a Fresnel rhomb 46, like rhomb 37 and operable upon incident beam 39 to deviate it along path 39c, the emergent beam 39d being coaxial with beam 18 and passing to the detector 23, as before.

Figure 3:
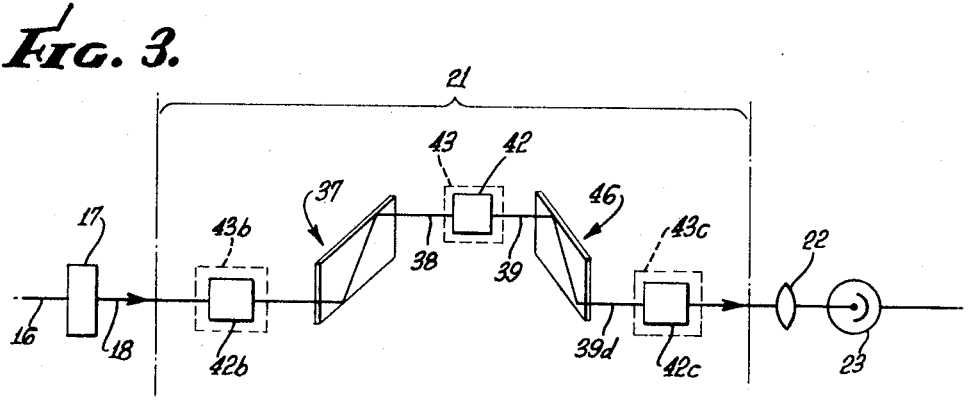
FIG. 3 is a diagram of a more generalized version of FIG. 2.

Referring to the more generalized FIG. 3 system, if the sample and holder are placed as at 42b and 43b in the path of the beam 18 passing between the first and second converters 17 and 37, the standard circular dichroism measurement (associated with the sample) is achieved, both converters or rhombs 37 and 46 remaining in place. If the sample and holder are placed as at 42 and 43 between second and third converters or rhombs 37 and 46, a linear dichroism measurement is achieved.

If the sample and holder are, however, placed as at 42c and 43c in the path of the beam 39d emanating from the third converter of rhomb 46, a circular dichroism measurement is obtained, but with sign opposite to that for the case where the sample and holder are in positions 42b and 43b. This is due to the fact that the two Fresnel rhombs oriented as shown provide the equivalent of a half wave retarder, which converters left circular polarization to right circular and vice versa.

Further, if two identical samples are simultaneously placed in the positions 42b and 42c, the net measured circular dichroism will be zero since the circular dichroism signal produced by the sample at 42b will be equal and opposite to the circular dichroism signal produced by the sample at 42c. If the two samples are not identical, the measured circular dichroism will be equal to the difference between the two circular dichroism signals due to the two samples. Thus, the invention affords a method and means for directly comparing the circular dichroism properties of two samples, i.e. obtaining difference circular dichroism measurements. Another consideration is that the phototube 23 in many forms is sensitive to the direction of a linearly polarized wave. Phototubes like the type 1P28 have rather marked response to orientations parallel and perpendicular to the long axis of the cathode. For such phototubes it is very desirable to have the polarization directions oriented at 45° to this cathode direction as is again suggested by the vectors 36 and 36a in FIG. 1. On the other hand, for end window phototubes, such as the International Telephone & Telegraph type FW130, the preferred direction tends to be random with respect to the phototube orientation, since the cathode in such tubes is ordinarily normal to the axis of the beam. It is this tendency to sensitivity to linear polarization direction which makes the arrangement shown in FIG. 3 desirable, since phototubes as a rule have very little sensitivity to the handedness of circularly polarized radiation.

Figure 4:
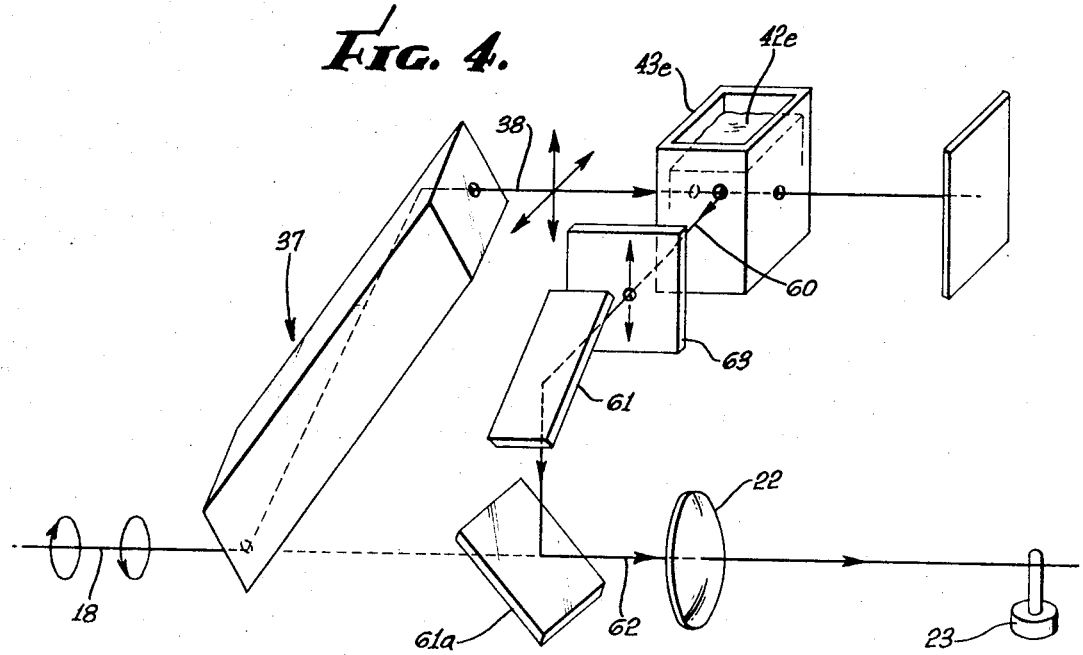
FIG. 4 is a perspective showing of another application of the invention.

A further feature of the invention concerns the provision of means located to collect fluorescence radiation from the sample space following the second converter means for directing such radiation to the detector for measurement purposes. As seen in the FIG. 4 example, radiation emanating at 60 from the fluorescing sample 42e in holder 43e is collected by mirror means 61 and 61a, and re-directed at 62 for focusing on the detector 23. Further, the emitted beam may be passed through a fixed analyzer 63, as for example, A Polaroid sheet, considering that the exciting beam at 38 alternates between two orthogonal states of linear polarization.

Figure 5:
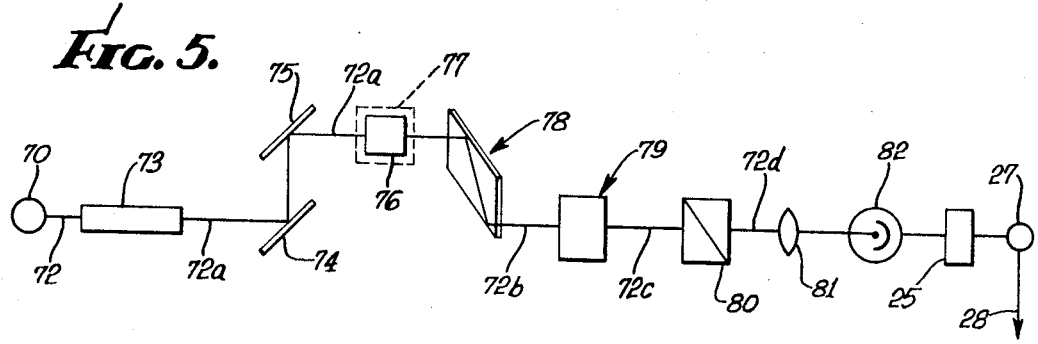
FIG. 5 is a schematic diagram of a modified system.

Finally, in the embodiment seen in FIG. 5, the arrangement of the elements in the beam path between the source 70 and detector 82 is characterized as reversed as compared with the arrangement in FIG. 1. Thus, in FIG. 5, the non-polarized beam of radiation 72 from the source encounters first the monochromator 73 from which beam 72a, corresponding to beam 14, emanates. After deviation by the mirrors 74 and 75, the beam 72a passes through the sample 76 in space 77. Thereafter, the "second" converter 78 (corresponding to converter 37) operates upon the beam, and resultant beam 72b passes to the "first" converter 79. The latter, corresponding to converter 17 in FIG. 1, operates upon the beam to produce beam 72c which then passes through the linear polarizer 80 corresponding to polarizer 15 in FIG. 1. Beam 72d leaving polarizer 80 passes via lens 81 to detector 82. The output from the detector is passed to circuitry 25 controlling actuator 27 for pen 28, as in FIG. 1.

We claim:

1. In a spectro-polarimeter having a source generating an electromagnetic radiation beam, a detector, the beam having a path extending between said source and detector, a linear polarizer in said path, and first converter means in said path to convert linearly polarized radiation from the linear polarizer to elliptically polarized radiation, the combination comprising:
   a. second converter means including a quarter-wave retarder in said path for converting elliptically polarized radiation from the first converter means to linearly polarized radiation, and b. means defining a sample space in the path of the linearly polarized beam passing from said second converter means, and c. said detector located to receive the linearly polarized radiation transmitted from the sample space.

2. The combination of claim 1 wherein said retarder has total internal reflection surfaces for intercepting said beam.

3. The combination of claim 1 wherein said retarder comprising a Fresnel rhomb.

4. The combination of claim 1 wherein said second converter means is characterized as located to operate upon the beam to alternate its polarization state between first and second linear states corresponding respectively to left and right circular states associated with said elliptically polarized radiation, said linear states having mutually orthogonal axes.

5. The combination of claim 4 including third converter means responsive to the beam passing from the second converter means to convert its polarization state to alternation between right and left circular.

6. The combination of claim 5, in which the third converter means is located to deflect the beam passing from the second converter means into coincidence with an optical axis defined by the beam passing through the first converter means.

7. The combination of claim 6 wherein said third converter means comprises a Fresnel rhomb.

8. In a spectropolarimeter having a source for generating an electromagnetic radiation beam, a detector, the beam having a path extending along an optical axis between said source and detector, a linear polarizer in said path, and first converter means in said path to convert linearly polarized radiation from the linear polarizer elliptically-polarized radiation, the combination comprising:

a. second converter means including a quarter-wave retarder in the form of a Fresnel rhomb in said path for converting elliptically polarized radiation from the first converter means to linearly polarized radiation, b. means defining a sample space in the path of the beam passing from the rhomb, and c. mirror means located to deflect the optical axis of the beam passing from the rhomb into coincidence with that of the beam incident on the rhomb.

9. In a spectropolarimeter having a source for generating an electromagnetic radiation beam, a detector, the beam having a path extending between the source and detector, a linear polarizer in said path, and first converter means in said path to convert linearly polarized radiation from the linear polarizer to elliptically-polarized radiation, the combination comprising:

a. second converter means in said path extending from the first converter means for operating upon the beam to alternate its polarization state between first and second linear states corresponding respectively to left and right circular states associated with said elliptically polarized radiation, said linear states having mutually orthogonal axes, b. third converter means responsive to the beam passing from the second converter means to convert its polarization state to alternation between right and left circular, and c. means defining a sample space located in the path of the beam passing between said second and third converter means.

10. The combination of claim 9 including another sample space located in the path of the beam passing between the first and second converter means.

11. The combination of claim 10 including a further sample space located in the path of the beam passing from the third converter means.

12. The combination of claim 11 including samples in said spaces between the first and second converter means and following the third converter means.

13. In a spectropolarimeter having a source for generating an electromagnetic radiation beam, a detector, the beam having a path between said source and detector, and a linear polarizer in said path, the combination comprising a. first and second converter means located in said path so that the beam passes through the second converter means prior to passage through the first converter means, b. The first converter means responsive to incident linearly polarized radiation to produce elliptically-polarized radiation, and the second converter means responsive to incident elliptically polarized radiation to produce linearly polarized radiation, the linear polarizer located in the path between the first converter means and the detector, and c. means defining a sample space in the path of the beam passing between the source and the second converter means.

* * * * *